(12) United States Patent
Schwery et al.

(10) Patent No.: US 8,049,393 B2
(45) Date of Patent: Nov. 1, 2011

(54) ROTOR FOR AN ELECTRIC MACHINE HAVING A RETAINING DEVICE FOR THE END WINDING

(75) Inventors: Alexander Schwery, Kuettigen (CH); Matthias Schmid, Birmenstorf AG (CH); Josef Schwanda, Lupfig (CH); Susanne Binder, Wettingen (CH)

(73) Assignee: Alstom Technology Ltd, Baden (CH)

( * ) Notice: Subject to any disclaimer, the term of this patent is extended or adjusted under 35 U.S.C. 154(b) by 9 days.

(21) Appl. No.: 12/569,452

(22) Filed: Sep. 29, 2009

(65) Prior Publication Data

US 2010/0079030 A1 Apr. 1, 2010

Related U.S. Application Data

(63) Continuation of application No. PCT/EP2008/053204, filed on Mar. 18, 2008.

(30) Foreign Application Priority Data

Mar. 30, 2007 (DE) .......................... 10 2007 015 797
Nov. 8, 2007 (DE) .......................... 10 2007 000 668

(51) Int. Cl.
*H02K 3/46* (2006.01)
*H02K 1/22* (2006.01)
(52) U.S. Cl. .................. 310/270; 310/260; 310/261.1
(58) Field of Classification Search ............... 310/261.1, 310/270, 260
See application file for complete search history.

(56) References Cited

U.S. PATENT DOCUMENTS

| | | | |
|---|---|---|---|
| 5,635,785 A | | 6/1997 | Schwanda et al. |
| 5,927,766 A | * | 7/1999 | Rosen ........................ 292/101 |
| 2003/0152441 A1 | * | 8/2003 | Monson ...................... 411/401 |
| 2005/0230510 A1 | * | 10/2005 | Flanhardt et al. ............ 241/242 |

FOREIGN PATENT DOCUMENTS

| | | |
|---|---|---|
| DE | 701612 C | 1/1941 |
| DE | 19519127 C1 * | 9/1996 |
| DE | 19513457 A1 | 10/1996 |
| EP | 0736953 A2 | 10/1996 |
| GB | 14680 | 6/1911 |
| JP | 63240343 A * | 10/1988 |
| WO | WO 9834327 A1 * | 8/1998 |

OTHER PUBLICATIONS

Machine Translation DE19519127 (1996).*
International Search Report for PCT/EP2008/053204, mailed Jul. 8, 2008.
German Search Report for DE 10 2007 000 668.5, dated Sep. 25, 2008.

* cited by examiner

*Primary Examiner* — Quyen Leung
*Assistant Examiner* — Jose Gonzalez Quinones
(74) *Attorney, Agent, or Firm* — Leydig, Voit & Mayer, Ltd.

(57) ABSTRACT

A rotor for an electric machine includes a rotor yoke having a plurality of axial winding slots distributed on an outer periphery of the rotor yoke; a winding bar disposed in one of the plurality of axial winding slots, the winding bar having at least one winding end emerging axially from the rotor yoke so as to form an end winding; and a retaining device including a plurality of radial bolts, each of the plurality of radial bolts having a head fixedly connected to a shank, wherein the retaining device retains the end winding against a centrifugal force acting on the end winding.

8 Claims, 3 Drawing Sheets

ROTOR FOR AN ELECTRIC MACHINE HAVING A RETAINING DEVICE FOR THE END WINDING

This application is a continuation application of International Application No. PCT/EP2008/053204, filed on Mar. 18, 2008, which claims priority to German Application Nos. DE 10 2007 015 797.7 and DE 10 2007 000 668.5, filed on Mar. 30, 2007 and Nov. 8, 2007, respectively. The entire disclosure of the applications is incorporated by reference herein.

The present invention relates to the field of electric machines. It refers to a rotor of an electric machine, especially of a hydrogenerator.

BACKGROUND OF THE INVENTION

As a result of the changed market economic conditions in the open electricity supply markets and the improved technologies in the field of power electronics, the subject of variable speed drives for energy production has gained in importance. For this purpose, doubly-fed asynchronous machines are preferably used, especially in the case of outputs of above 60 MVA.

The stator of this type of machine does not differ from those of salient pole synchronous machines which are used for this application. Machines of this type are characterized in that they are equipped with a three-phase winding both on the stator as well as on the rotor. In this case, the end windings of the rotor winding are customarily arranged on a cylindrical surface (see for example DE-A1-195 13 457).

As a result of centrifugal force, the winding bars have the tendency to move away from the center radially outwards during operation. The difficulty in the case of said construction of the end windings is in sufficiently protecting the bars of the winding against deformation as a result of mechanical forces. For this, three solutions are generally made available:
- In the case of smaller machines, the entire end winding is wound with a plurality of layers consisting of steel wire. For production engineering reasons this is not advisable in the case of larger diameters.
- In the case of machines with diameters of more than 2 meters, the end windings are fastened on the axial extension of the rotor yoke either by means of radial bolts or threaded rods with a support, as is described in the aforementioned publication, or
- The entire end winding is enclosed by a shrunk-on steel cylinder, as is known in the case of non-salient pole synchronous machines.

The aforementioned publication concentrates particularly on the description of the overall construction with the associated end winding support system. The bolts which are used in this case serve for the radial support of the rotor end windings and are anchored in the axially raised rotor yoke (see FIGS. 4 and 5 of the publication with the bolts 37). The bolts are threaded rods which on the one hand are screwed (36) in the rotor yoke, and on the other hand, on the air-gap side, absorb the resulting centrifugal forces by means of rectangular individual elements and nuts. The disadvantage of the described system lies in the large number of individual parts and the associated risk of destruction of the machine when losing a bolt or a nut.

The development which is described in the following text deals in more detail with the bolts which are used and especially with their secure fixing.

SUMMARY OF THE INVENTION

An aspect of the present invention is to further develop the rotor which is referred to in the introduction in such a way that the disadvantages of the known solution are avoided and in particular a secure fixing of the radial bolts results.

In an embodiment, the radial bolts have heads which are connected to the shank in a fixed manner. As a result of this, on the one hand the number of components which are used is drastically reduced. On the other hand, the risk of nuts or washers, which lie on the outside, being able to become detached and the machine being able to be damaged or completely destroyed, is eliminated.

According to one development of the invention, the heads of the radial bolts are connected to the shank in a materially bonding manner, preferably being forged or welded. As a result of this, the use of specially formed heads is made easier.

In order to reduce the air resistance of the rotating rotor, it is advantageous in this case if the heads of the radial bolts have an aerodynamically favorable shape, wherein in particular the heads of the radial bolts are rounded on the upper side and have two straight flanks on opposite sides for drawing up the bolts.

Another development of the invention is characterized in that a plurality of radial bolts, which are arranged in series in the axial direction, in each case press a common retaining strip, which extends in the axial direction, against the end winding from the outside. As a result of this, an even pressure distribution of the drawn-up bolts upon the end winding is achieved without the number of elements which are used having to be significantly increased as a result of separate washers. In order to also minimize the air resistance in this case the retaining strips have rounded longitudinal edges for improving the aerodynamics.

A further development of the invention is characterized in that for fastening the bolts on the outer periphery of an axial extension of the rotor yoke, which extension is located inside the end winding, hammer-shaped recesses are provided, into which counter strips, which in the axial direction are provided with threaded holes, are inserted for screwing in the radial bolts, wherein in particular the radial bolts which are associated with a retaining strip in each case are screwed into a common counter strip. As a result of this, not only installation is simplified but the number of components is also kept low.

Furthermore, means for locking the radial bolts against rotation are preferably provided, wherein in particular the radial bolts, on the inner end in each case, have a recess with a rectangular locating face, and the radial bolts are locked against rotation by means of locking strips which are axially inserted into the recesses and abut against the locating faces.

BRIEF DESCRIPTION OF THE DRAWINGS

The invention is to be subsequently explained in more detail based on exemplary embodiments in conjunction with the drawing. In the drawing.

DETAILED DESCRIPTION

The proposed solution is based on the idea of reducing the number of individual parts of the end-winding retaining device and at the same time of mechanically locking all the parts against becoming detached as a result of vibrations. As a result, a significant increase of the safety of the system is achieved.

Figure 1:
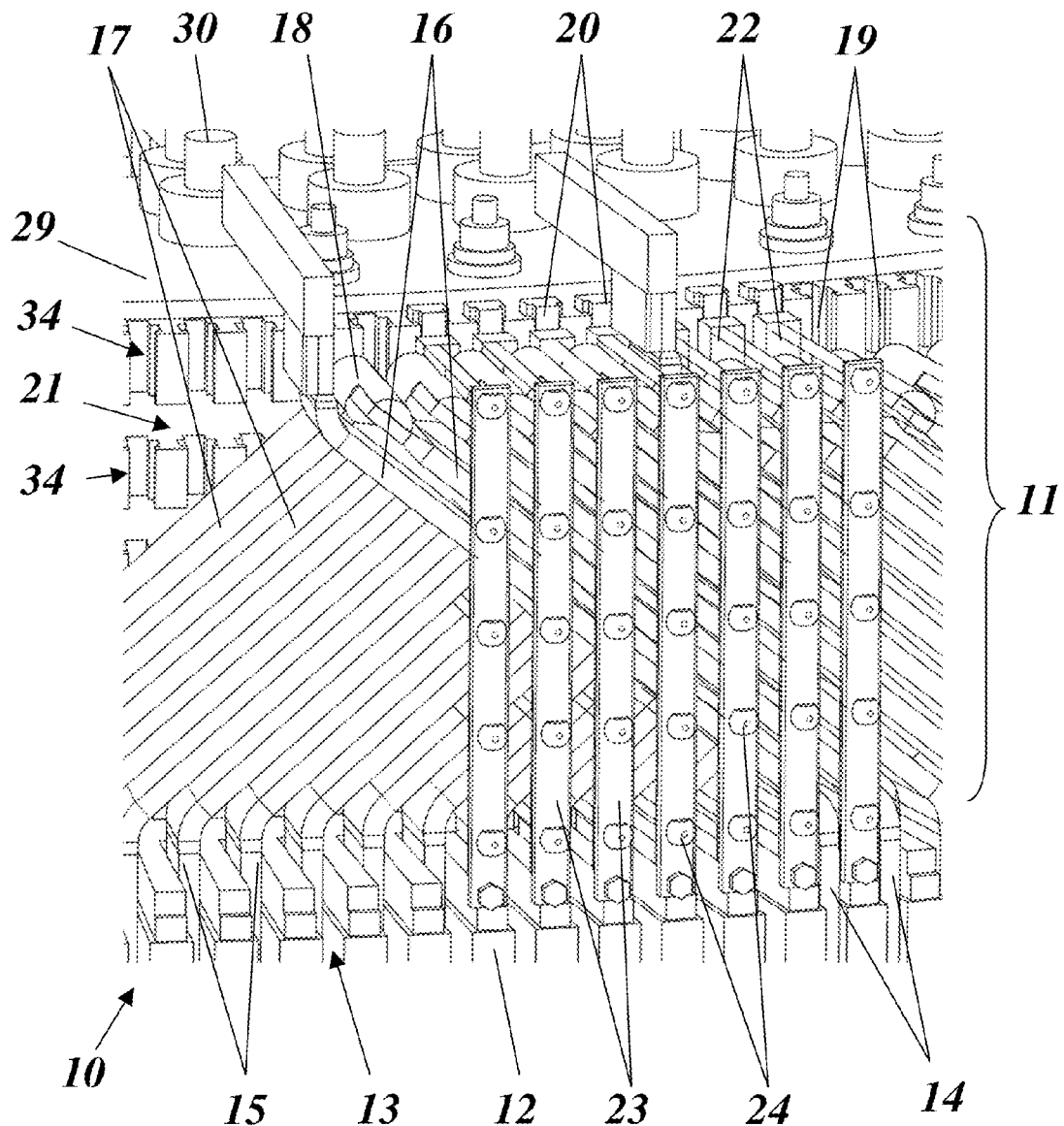
FIG. 1 shows in the radial direction, as seen from the outside, the end winding with a retaining device according to a preferred exemplary embodiment of the invention.

In FIG. 1, as seen in the radial direction from the outside, a detail of a rotor 10 of a large hydrogenerator/motor with an end winding 11 is shown, which end winding is equipped with a retaining device according to a preferred exemplary embodiment of the invention. The basic construction of the rotor 10 can be gathered from the publication which is quoted in the introduction. The rotor 10 has a cylindrical rotor yoke 12 with axial winding slots 13 which are arranged in a distributed manner on the outer periphery. Winding bars 14, 15 of the rotor winding are inserted into the winding slots 13 (in pairs one above the other in each case). The winding ends 16, 17 which axially emerge from the rotor yoke 12 are cranked and according to a predetermined winding or phase diagram are electrically interconnected at the ends by means of rings 18. The winding ends 16, 17 are part of the end winding 11.

Inside the end winding 11, a (cylindrical) axial extension 21 of the rotor yoke 12 extends in the axial direction and is terminated on the end face by means of a pressure plate 29, upon which a number of axial tension bolts 30 are supported, which hold together the lamination stack of the rotor yoke 12 in the axial direction. On the outer circumference of the extension 21 a plurality of shrouds 34 are arranged in series in the axial direction, in which are provided hammer-shaped recesses 19 which are distributed uniformly over the circumference and serve for fastening the retaining device according to the invention for the end winding 11. The retaining device comprises a number of radial bolts 24.

Figure 2:
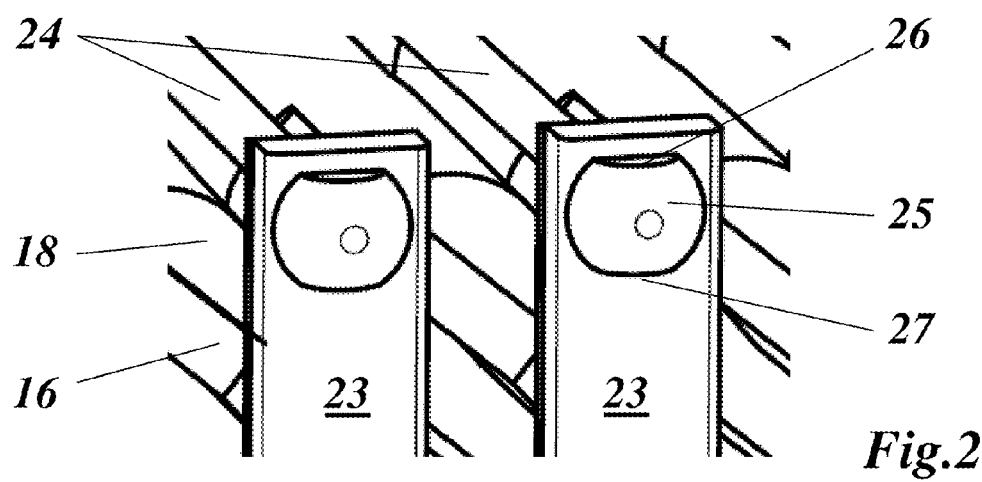
FIG. 2 shows an enlarged detail from FIG. 1 with the aerodynamically formed heads of the radial bolts.
Figure 3:
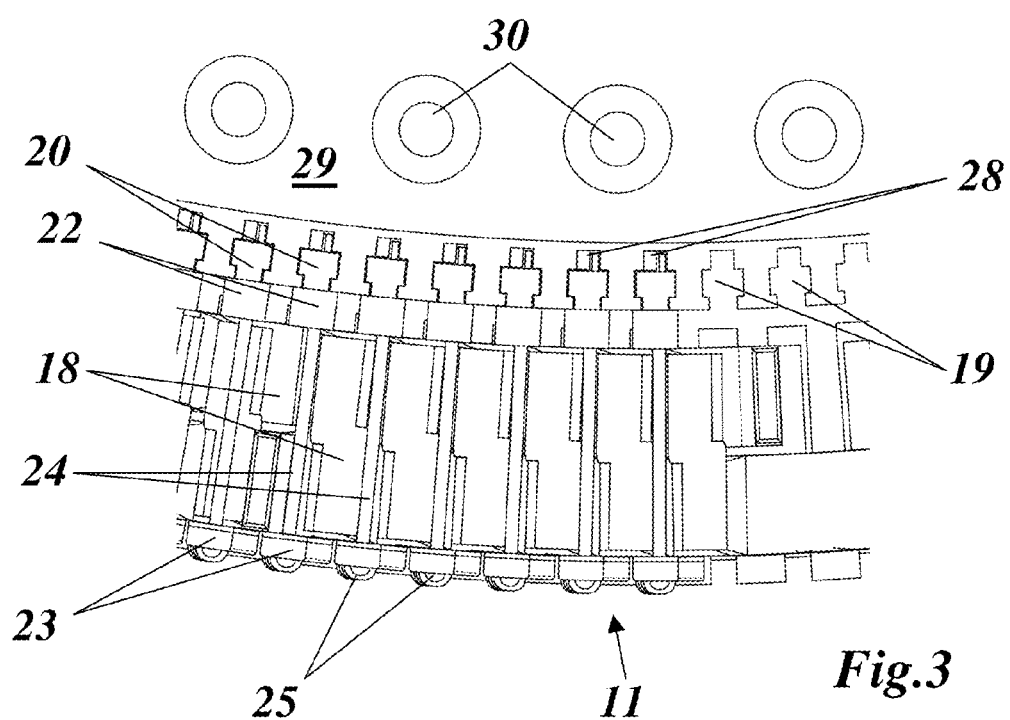
FIG. 3 shows a plan view of the end winding from FIG. 1.
Figure 5:
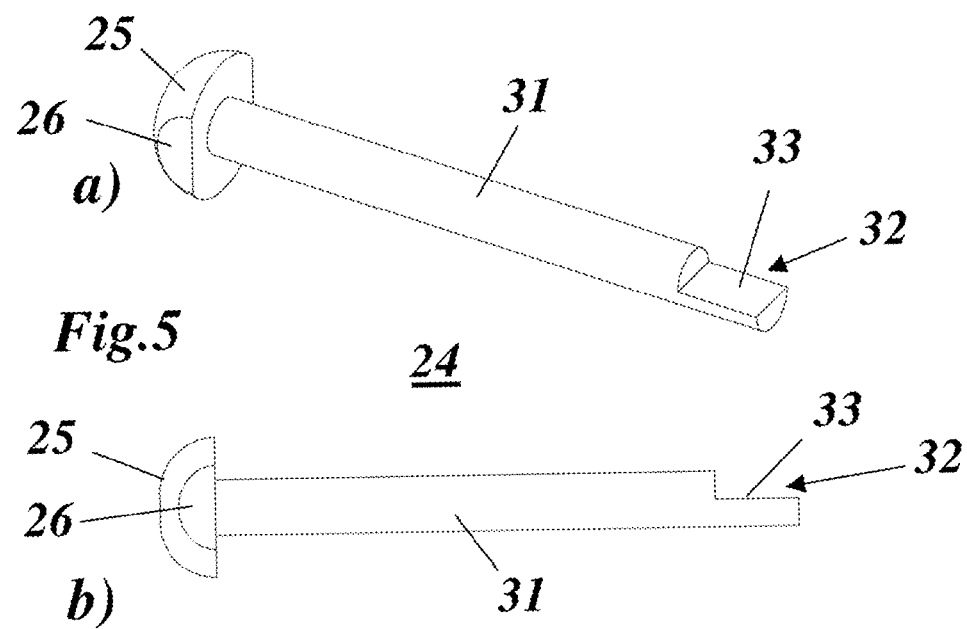
FIG. 5 shows in two sub-FIGS. 5(a) and 5(b) two different views of a radial bolt, as is used in the retaining device of FIG. 1.

As is apparent from FIGS. 2 and 5, radial bolts 24 are used, which have heads 25 which are connected to the shank 31 in a fixed manner. The fixed connection of the heads 25 to the bolts 24 is preferably carried out in a materially bonding manner, for example by means of forging or welding. Therefore, especially bolts 24 with forged-on or fix-welded heads 25 are used. The heads 25 have two opposite straight flanks 26, 27 which serve for drawing up the bolts 24 with an open-end wrench or the like. In addition, instead of rectangular washers, axially extending retaining strips 23 are used which distribute the retaining forces of the bolts 24 evenly onto the winding or the end winding 11.

The bolt heads 25 as well as the retaining strips 23 are further characterized by their aerodynamic shape (round heads 25 and rounded edges of the retaining strips 23), which leads to a reduction of the friction losses during operation.

The radial bolts 24 extend in the radial direction through the end winding 11 and are accommodated in the hammer-shaped recesses 19 in the axially widened rotor yoke (21). The bolts 24 are retained by means of a counter strip 20 which is provided with threaded holes. Corresponding to the retaining strip 23, on the front side the counter strip 20 extends over the length of the rotor yoke extension. Each bolt 24 can therefore be screwed in individually and brought to the required tension. Axial spacers 22, through which the bolts 24 pass, are additionally arranged between end winding 11 and the extension 21 of the rotor yoke 12.

Figure 4:
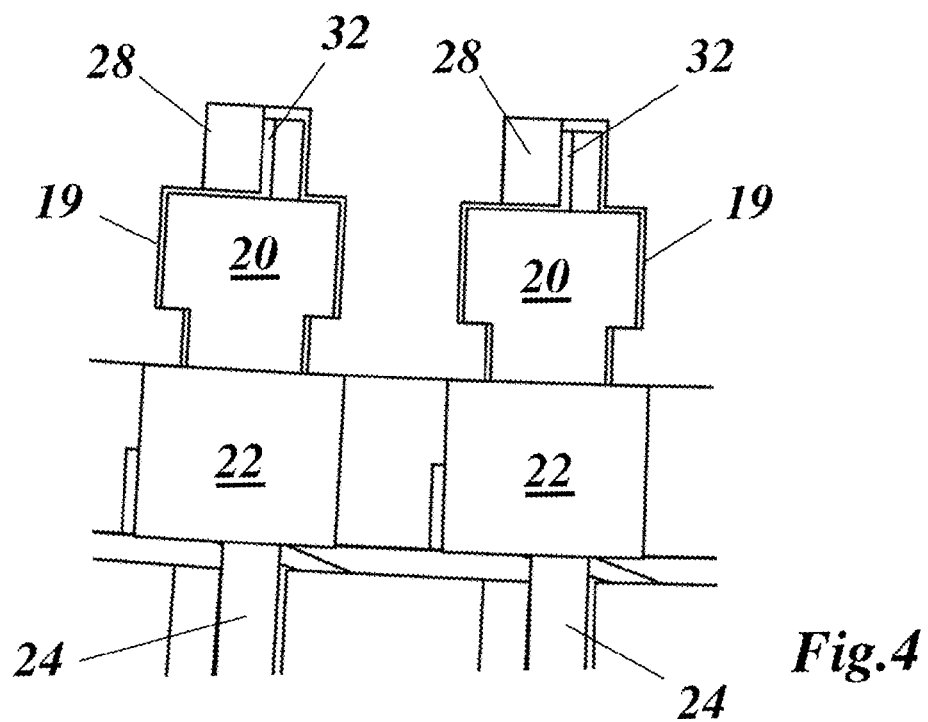
FIG. 4 shows an enlarged detail from FIG. 3 with the fastening and locking elements for the radial bolts.

As is apparent from FIG. 5, the otherwise round bolts 24 on the free end have a recess 32 with a rectangular locating face 33. This is for the following reason: the bolts 24 are drawn up to the necessary tension by means of suitable tools so that in the end position the straight flanks 26, 27 of the bolt heads 25 lie transversely to the longitudinal axis of the machine, as is shown in FIGS. 1 and 2. In this position, the rectangular locating face 33 of the ends of the bolts 24 extends parallel to the flanks of the hammer-shaped recesses 19. As soon as all the bolts 24 of a row (retaining strip 23) have then been fitted, a locking strip 28 (FIG. 4) can be introduced into the remaining recess. In this case, the locking strip 28 is dimensioned so that the bolts 24 can no longer be rotated. In a simple way this principle allows locking of all the parts of the retaining device against unforeseen loosening of the threaded parts. Furthermore, it is also possible in the same way to lock the bolts 24 on both sides with an inserted strip if the ends of the bolts are correspondingly provided with two parallel locating faces. Finally, a further possibility of locking would be to provide the bolts 24 with slots at the back through which a metal wire can be inserted for locking.

LIST OF DESIGNATIONS

10 Rotor
11 End winding
12 Rotor yoke
13 Winding slot
14, 15 Winding bar
16, 17 Winding end (cranked)
18 Rings
19 Recess
20 Counter strip
21 Extension (rotor yoke)
22 Spacer
23 Retaining strip
24 Bolt
25 Head (bolt)
26, 27 Flank
28 Locking strip
29 Pressure plate
30 Tension bolt
31 Shank
32 Recess
33 Locating face
34 Shroud

What is claimed is:

1. A rotor for an electric machine comprising:
    a rotor yoke having a plurality of axial winding slots distributed on an outer periphery of the rotor yoke;
    a winding bar disposed in one of the plurality of axial winding slots, the winding bar having at least one winding end emerging axially from the rotor yoke so as to form an end winding;
    a retaining device including a plurality of radial bolts, each of the plurality of radial bolts having a head fixedly connected to a shank, the retaining device including a retaining strip extending in an axial direction against the end winding and the plurality of radial bolts being arranged in series in the axial direction and configured to press the retaining strip against the end winding, wherein the retaining device retains the end winding against a centrifugal force acting on the end winding;
    at least one hammer-shaped recess configured to receive at least one counter strip having a threaded hole configured to receive one of the plurality of radial bolts so as to fasten the respective bolt on an outer periphery of an axial extension of the rotor yoke, wherein the axial extension is disposed inside the end winding, and wherein each of the plurality of radial bolts associated with each retaining strip is screwed into a common counter strip; and
    a locking strip configured to lock the plurality of radial bolts against rotation, wherein each of the plurality of radial bolts include a recess with a rectangular locating face disposed on an inner end of each of the plurality of radial bolts, the locking strip being axially inserted into the recess and disposed against the rectangular locating face.

2. The rotor as recited in claim 1, wherein each head of the plurality of radial bolts is materially bonded to the shank.

3. The rotor as recited in claim 2, wherein each head of the plurality of radial bolts is welded to the shank.

4. The rotor as recited in claim 1, wherein each head of the plurality of radial bolts has an aerodynamic shape.

5. The rotor as recited in claim 4, wherein each head of the plurality of radial bolts has a rounded upper side and two straight flanks on opposite sides for drawing up the respective radial bolt.

6. The rotor as recited in claim 1, wherein the retaining strip includes at least one rounded longitudinal edge so as to improve aerodynamics.

7. A rotor for an electric machine comprising:

a rotor yoke having a plurality of axial winding slots distributed on an outer periphery of the rotor yoke;

a winding bar disposed in one of the plurality of axial winding slots, the winding bar having at least one winding end emerging axially from the rotor yoke so as to form an end winding; and a retaining device including a plurality of radial bolts, each of the plurality of radial bolts having a head fixedly connected to a shank, the retaining device including a locking strip configured to lock the plurality of bolts against rotation, wherein the retaining device retains the end winding against a centrifugal force acting on the end winding, and wherein each of the plurality of radial bolts include a recess with a rectangular locating face disposed on an inner end of each of the plurality of radial bolts, the locking strip being axially inserted into the recess and disposed against the rectangular locating face.

8. The rotor as recited in claim 7, wherein the retaining device includes a retaining strip extending in an axial direction against the end winding, the plurality of radial bolts being arranged in series in the axial direction and configured to press the retaining strip against the end winding.

* * * * *